United States Patent [19]
Mertz

[11] Patent Number: 5,307,650
[45] Date of Patent: May 3, 1994

[54] WASHING MACHINE RINSE WATER RECYCLING APPARATUS

[75] Inventor: John C. Mertz, Mansfield, Ohio

[73] Assignee: Future Water, Inc., Mansfield, Ohio

[21] Appl. No.: 935,850

[22] Filed: Aug. 26, 1992

[51] Int. Cl.⁵ .................. D06F 33/02; D06F 39/02; D06F 39/08; D06F 39/10
[52] U.S. Cl. .................. 68/12.12; 68/12.19; 68/13 R; 68/18 F; 68/207; 68/208; 68/902
[58] Field of Search .......... 68/901, 12.12, 12.19, 68/13 R, 18 F, 207, 208

[56] References Cited

U.S. PATENT DOCUMENTS

| | | | |
|---|---|---|---|
| 1,296,823 | 3/1919 | Lehmann | 68/208 X |
| 2,302,012 | 11/1942 | Dyer | 68/902 X |
| 2,498,885 | 2/1950 | Geldhof et al. | 68/208 X |
| 2,588,774 | 3/1952 | Smith . | |
| 2,701,582 | 2/1955 | Graham et al. | 68/208 X |
| 2,959,042 | 11/1960 | Henshaw, Jr. . | |
| 2,972,876 | 2/1961 | Geldhof | 68/208 X |
| 3,027,908 | 4/1962 | Cochran | 68/208 X |
| 3,170,314 | 2/1965 | Worst . | |
| 3,295,339 | 1/1967 | Cheyne | 68/13 R X |
| 3,841,116 | 10/1974 | Klein et al. . | |
| 5,097,556 | 3/1992 | Engel et al. | 68/18 F X |

FOREIGN PATENT DOCUMENTS 124562 9/1979 Japan .................... 68/902

*Primary Examiner*—Philip R. Coe
*Attorney, Agent, or Firm*—Jerry W. Semer

[57] ABSTRACT

This invention in its most basic form is a reservoir container that is adapted to hold the rinse water from the final rinse cycle of a washing machine and a means for conveying the rinse water after being used in the final rinse cycle of the washing machine into the reservoir and the means for returning that water to the wash machine for the beginning of the wash cycle of the next load. The reservoir in the preferred embodiment for a household wash machine holds approximately twenty-five gallons. It is hooked to the washer drain through a two way valve. During the wash cycle this two way valve allows the water to flow out of the washer and into the drain. But for the final rinse cycle the valve directs the water from the washer into the reservoir. The reservoir is also hooked to the incoming water source of the washer by a two way valve. When the reservoir is filled with the rinse water from a previous wash and the washer started for a new wash, this incoming two way valve allows the water from the reservoir to flow into the washer. When the washer again calls for water for the rinse cycle, the valve allows the water from the household water supply to flow into the washer.

20 Claims, 7 Drawing Sheets

WASHING MACHINE RINSE WATER RECYCLING APPARATUS

FIELD OF THE INVENTION

This invention relates to a washing machine and more particularly to the saving of water during the washing process in said washing machine.

BACKGROUND OF THE INVENTION

In most areas of Western United States conservation of water is extremely important. The scarcity of water in the Western United States has created mandatory water conservation in many states. The hardest hit states are Arizona, California, Texas, Nevada, Colorado, Utah, and New Mexico. The situation is so bad in many communities that water rationing is being considered as means for controlling water usage. In some areas it is illegal to water the lawn or wash cars.

As the result of water shortages there have been many inventions in the fields of toilet and showers to cut down use of water while individuals are taking a shower or in flushing a toilet. In fact in some areas of the country only low volume toilets can be sold for instillation due to the problems they have with water consumption.

In National Wildlife What Happen to Cheap Water? (June/July, 89,) it states that it is estimated that laundry takes up 12% of the water usage's of the home. The (Jun. 9, 1992) USA today states that the average washing machine uses 50 gallons of water per washing. Thus, the washing machine is a prime target for saving water.

Further, the great disadvantages of the state of the art of washing machines as relates to the conservation of water are the market saturation and durability of the appliance. The Residential Energy Consumption survey of 1987 by the US Energy Information of Administration reports the 75% of United States household, that is Sixty Seven Million (67,000,000), have clothes washing machines. Appliance Magazine reports that the average clothes washing machine has a life of thirteen years. Industrial's sales total about 6.2 million units in 1988. Therefore, even if all consumers purchase a new water saving machine in one year, over 90% of all homes would use the inefficiency model already in the home. This will provide years of future service.

Therefore, one of the objective of this invention is to provide an "add on" clothes washing machine rinse water recycling apparatus for use in conjunction with existing clothes washing machines as a means of water conservation to save up to 50% of the water used during normal machine operation. A further objective of this invention is to provide a clothes washing machine rinse water recycling apparatus wherein the last rinse water of said washing machine is stored in a reservoir for used in the next first wash cycle of said machine.

In order to sell this water recycling washing machine or an "add on" apparatus to recycle the water of the wash machine, it is necessary to have an inexpensive and easily used device. Therefore, one of the objectives is to provide an add on clothes washing machine rinse water recycling apparatus wherein said washing machine components, specifically the water pump, is used to move said rinse water to the desired and fixed location whereby eliminating the need to duplicate its water pump within said recycling apparatus, thus, significantly reducing the manufacturing costs of the recycling apparatus. Further, it is an objective of this "add on" clothes washing machine recycling apparatus to use as many of the washing machine's components so as to significantly reduce manufacturing cost. Further, then it is an objective of this invention to use the cycle operation timing device to control the cycle operation of said recycling apparatus thus significantly reducing manufacturing cost of said recycling apparatus. Further, it is an objective of this invention to place the recycling apparatus in a fixed location and close approximately to said clothes washing machine as a means for utilizing existing components within said clothes washing machine. Also said recycling apparatus is built to relatively the same height and depths as the washing machine to providing efficient use of space in the laundry area. It is a further objective of this invention to build a device for recycling the water of washing machine that can be added on to existing washing machine to provide a substantial consumer market for the applicance manufacturers due to the durability and market saturation factors as they related to the existing washing machines. A further objective is to provide an add on washing machine rinse water recycling apparatus wherein consumer demand for said recycling apparatus enables said washing machines manufacturers to utilize productions facilities that are idle due to poor sales resulting from washing machines saturation thereby providing finical stability for the washing machine manufacturers.

It is further objective of this invention to save approximately 50% of the water usage of the common washing machine. By recycling the last rinse water for the use in the first wash cycle, it is possible to save up to 50% of the family water usage for laundry which is five percent (5%) of house hold water usage's. It is likely that in a twenty year period the average family will save enough water with this method too supply the family's household needs for an entire year.

Many other objective and advantages of the invention will become apparent from a consideration of the ensuing drawings and corresponding description.

SUMMARY OF THE INVENTION

This invention in its most basic form is a reservoir container that is adapted to hold the rinse water from the final rinse cycle of a washing machine and a means for conveying the rinse water after being used in the final rinse cycle of the washing machine into the reservoir and the means for returning that water to the wash machine for the beginning of the wash cycle of the next load. The reservoir in the preferred embodiment for a household wash machine holds approximately twenty-five gallons. It is hooked to the washer drain through a two way valve. During the wash cycle this two way valve allows the water to flow out of the washer and into the drain. But for the final rinse cycle the valve directs the water from the washer into the reservoir. The reservoir is also hooked to the incoming water source of the washer by a two way valve. When the reservoir is filled with the rinse water from a previous wash and the washer started for a new wash this incoming two way valve allows the water from the reservoir to flows into the washer. When the washer again calls for water for the rinse cycle the valve allows the water from the household water supply to flow into the washer.

DETAILED DESCRIPTION OF THE PREFERRED EMBODIMENT

Figure 1:
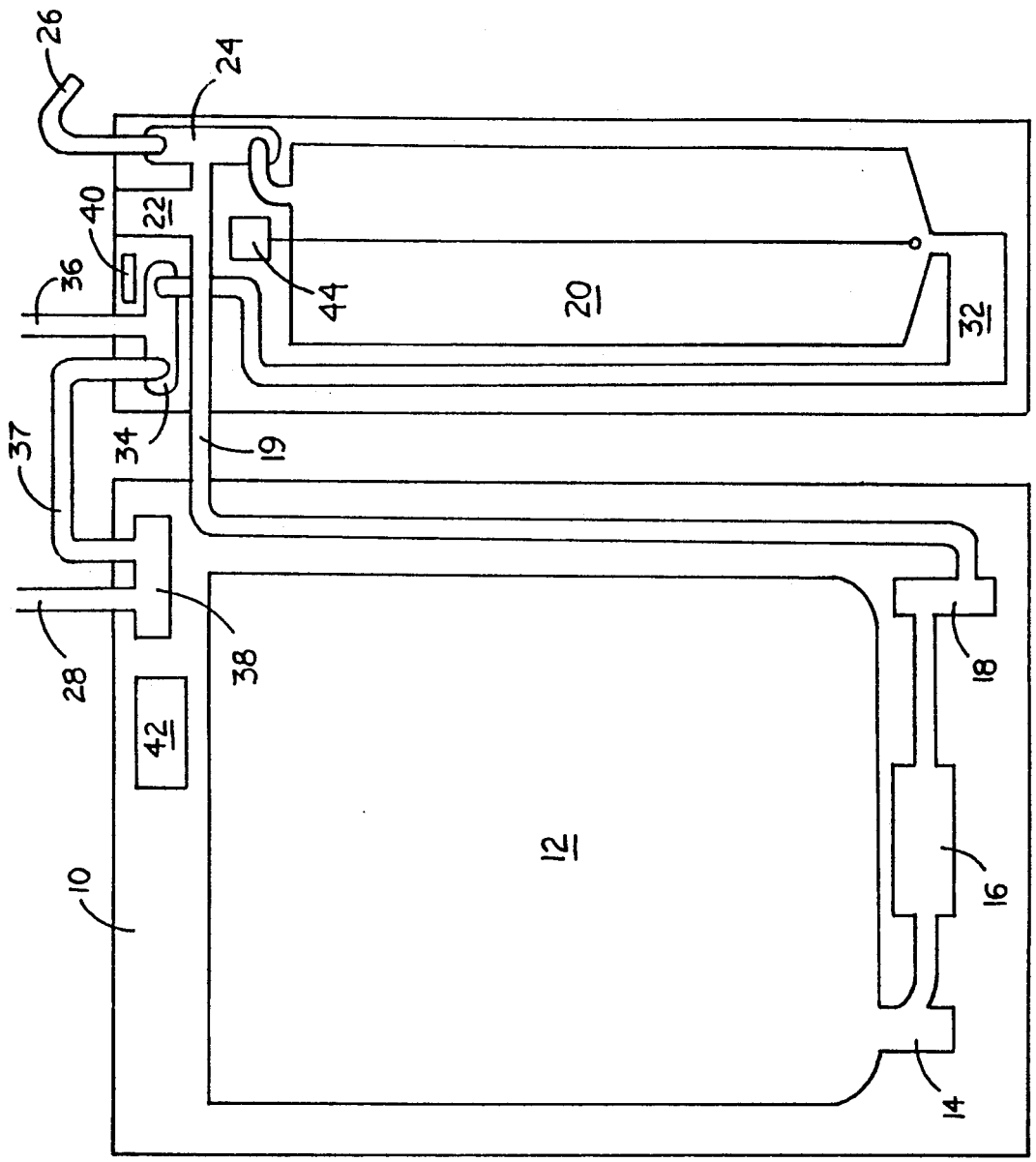
FIG. 1 is a block drawing of a household washing machine with the invention attached.

FIG. 1 shows a block diagram of a washer with the invention attached. In FIG. 1 the washer 10 is comprised of a tub 12 which has a outlet 14 in the bottom of the tub 12. Water flowing out the outlet 14 flows to a pump 16 and a filter 18 and in a normal washing machine to a drain. However, as shown in FIG. 1 the water from the washer drainage system which comprise of the outlet 14 the pump 16 and the filter 18 flows into the reservoir 20. The water from the washer first flows through another filter 22 and then into a diverter valve 24. This two way valve either allows the water to flow out to the external drain 26 or into the reservoir 20. In this system when the water coming from the tub 12 is the final rinse water of a wash, the water is directed by the diverter valve 24 into the reservoir 20. All other wash water coming from the tub is directed by the diverter valve 24 to the external drain 26.

When an individual starts up the washer and there is water in the reservoir 20, water is pumped from the reservoir by pump 32 into the washer input valve 34. The washer input valve 34 is also hooked to the cold water supply 36. The out flow 38 of the washer input valve 34 is hooked to the cold water supply input 37 of the washer 10. The water from the cold water supply input 37 is mixed with the water from the hot water supply input 28 and flows into the tub 12. The washer input valve 34 allows the water to flow from the reservoir 20 into the washer 10 when the wash cycle begins. At all other times when the washer 10 calls for water, the washer input valve 34 allows the water from the cold water supply 36 to flow into the washer 10.

This whole process is in controlled by an electronic timing system 40 that is hooked to the washer timer 42. The electronic timing system 40 controls the pump 32, the diverter valve 24, and washer inlet valve 34. The electronic timing system also receives a signal from a water sensing assemble 44 that is placed in the reservoir 20 and senses the water level of the reservoir 20. When the washer timer 42 signals the electronic timing system of the reservoir 40 that a wash cycle begins, the electronic timing system 40 checks with the sensor 44 to see whether there is any water in the reservoir 20. If in fact there is water in the reservoir 20, the electronic timing system 40 signals a reservoir pump 32 to begin pumping water out of the reservoir and into the washer input valve 34. The electronic timing system also signals the washer input valve to close off the cold water supply 36 and allow the water from the reservoir 20 to flow into the washer's tub 12. When the washer timer signals electronic timing system 40 that water is needed for other cycles of the washer 10, the electronic timing system 40 signals the washer input valve 34 to open the cold water supply so that the water from the cold water supply can flow into the washer 10.

The electronic timing system 40 also controls the water coming into the reservoir. When the washer's timer 42 signals the electronic timing circuit 40 that the final rinse water is being emptied from the washer 10, the electronic timing circuit 40 closes the flow channel of diverter valve 24 to the drain and opens the flow channel of the valve into the reservoir 20 allowing the water to flow from the washer 10 into the reservoir 20. When the washer's timer 42 signal the electronic timing circuit that water is being pumped out of the tub from cycles other than the final rinse cycle the electronic timing system 40 signal valve 24 to close its flow into the reservoir and open the flow channel to the drain.

Figure 2:
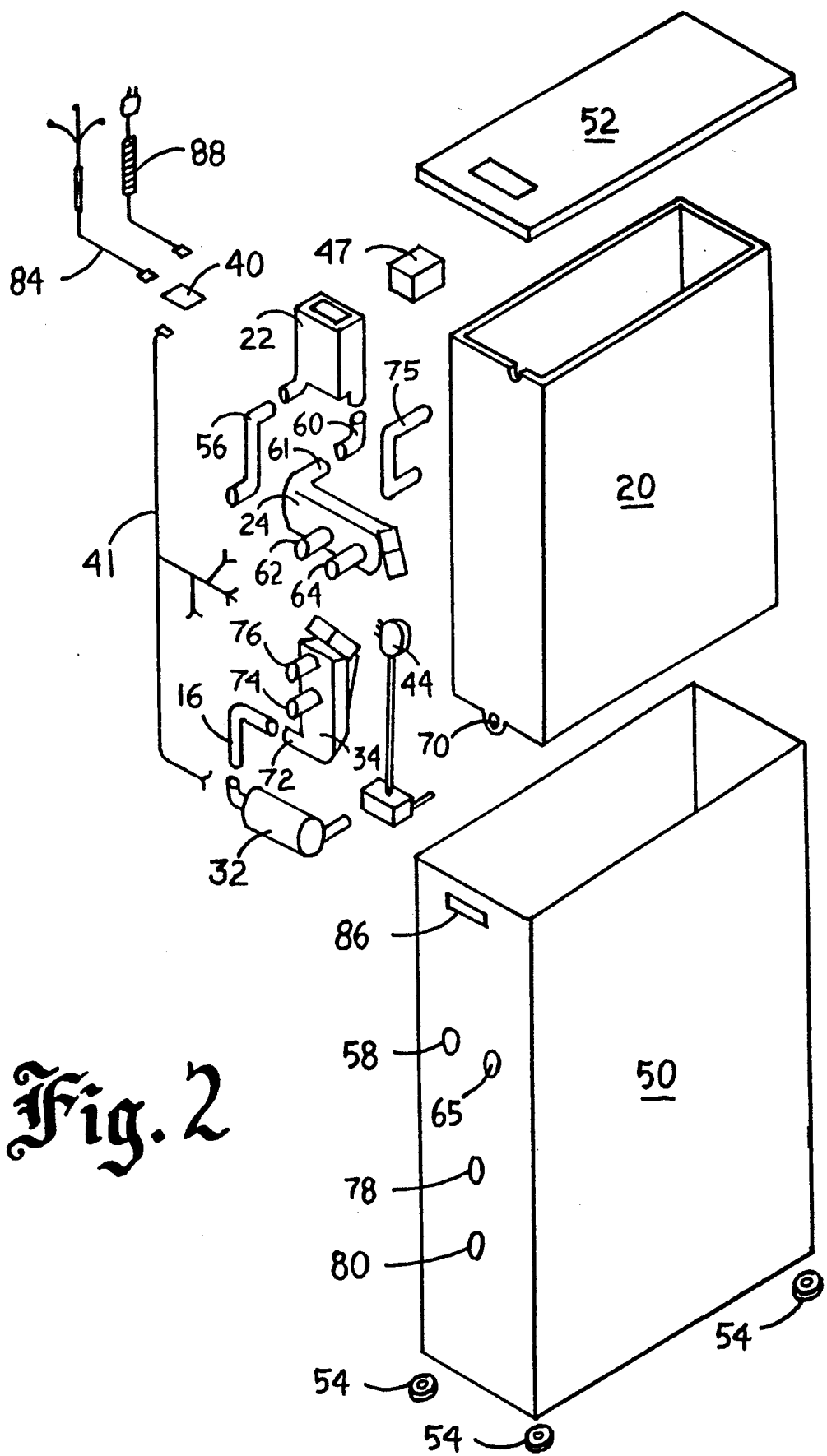
FIG. 2 is an exploded view of a household washing machine with the invention.

FIG. 2 shows an exploded view of an embodiment of the invention that can be used on a home washing machine. FIG. 2 shows a cabinet 50 which the reservoir 20 fits within. The cabinet 50 is designed with a lid 52 and leveling feet's 54 that can be adjusted so that the reservoir 20 will set level on a floor. Within the reservoir 20 one sees the water sensing assembly 44 which is attached to the electronic timing system 40. Also within the reservoir 20 is a germicidal lamp 46 or germicidal dispenser 47.

A hose 56 is attached to the drain of the washer 10 and is run through hole 58 in the reservoir cabinet 50 and into filter 22. The water than goes from filter 22 through a pipe 60 and into a diverter valve 24. Diverter valve 24 has two outlets. The reservoir outlet 62 runs into the reservoir 20 and the drain outlet 64 runs to the outside drain. When the final rinse water is coming from the washer the electronic timing system 40 closes the drain valve 64 and opens the reservoir valve 62 allowing the final rinse water to run into the reservoir 20. On any other cycle when the water comes from the wash machine the electronic timing system 40 sends a signal to diverter valve 24 to close the reservoir valve 62 and open the drain valve 64 and the water is thus directed to an external drain.

When the timing circuit from the washer 42 tells the electronic timing system of the reservoir 40 that the washer's cycle is beginning, the electronic timing system of the reservoir 40 turns on pump 32 which is attached to the bottom of the reservoir by outlet 70. The water is pumped through line 16 to inlet 72 in the washer inlet valve 34. The washer inlet valve 34 has two inlets. The reservoir inlet 72 and the cold water supply inlet 74. The cold water supply inlet 74 is attached to the cold water supply for the home. When the electronic timing system 40 has received a signal from the washer that the wash's cycle is beginning the electronic timing system 40 not only turns on pump 32 but also signals the washer input valve 34 to close the cold water inlet 74 and open the reservoir inlet 72. The water from the pump 32 then runs into the washer input valve 34 and out the washer input valve outlet 76. This water runs out the reservoir cabinet through an outlet 75 which proceed through opening 78 and into the washer. When the washer timing system 42 signals the electronic timing system 40 that the washer requires water other than at the beginning of the wash cycle the electronic timing system signals 40 the washer input valve 34 to close the reservoir input 72 and open the cold water supply input 74. The water from the cold water supply flows into the reservoir cabinet through opening 80 and into the washer input valve 34 and than out through the washer input valve outlet 76 and into the washer 10. The electronic timing system is connected to the washer timer 42 by electrical wires 84 that flows from the washer into the reservoir cabinet 52 through opening 86 and into the electronic timing system 40. The electronic timing system 40 gets its power from an AC power source. The electronic timing system power comes from power cable 88 which goes into the cabinet through opening 86 and into the electronic timing system 40.

Figure 6:
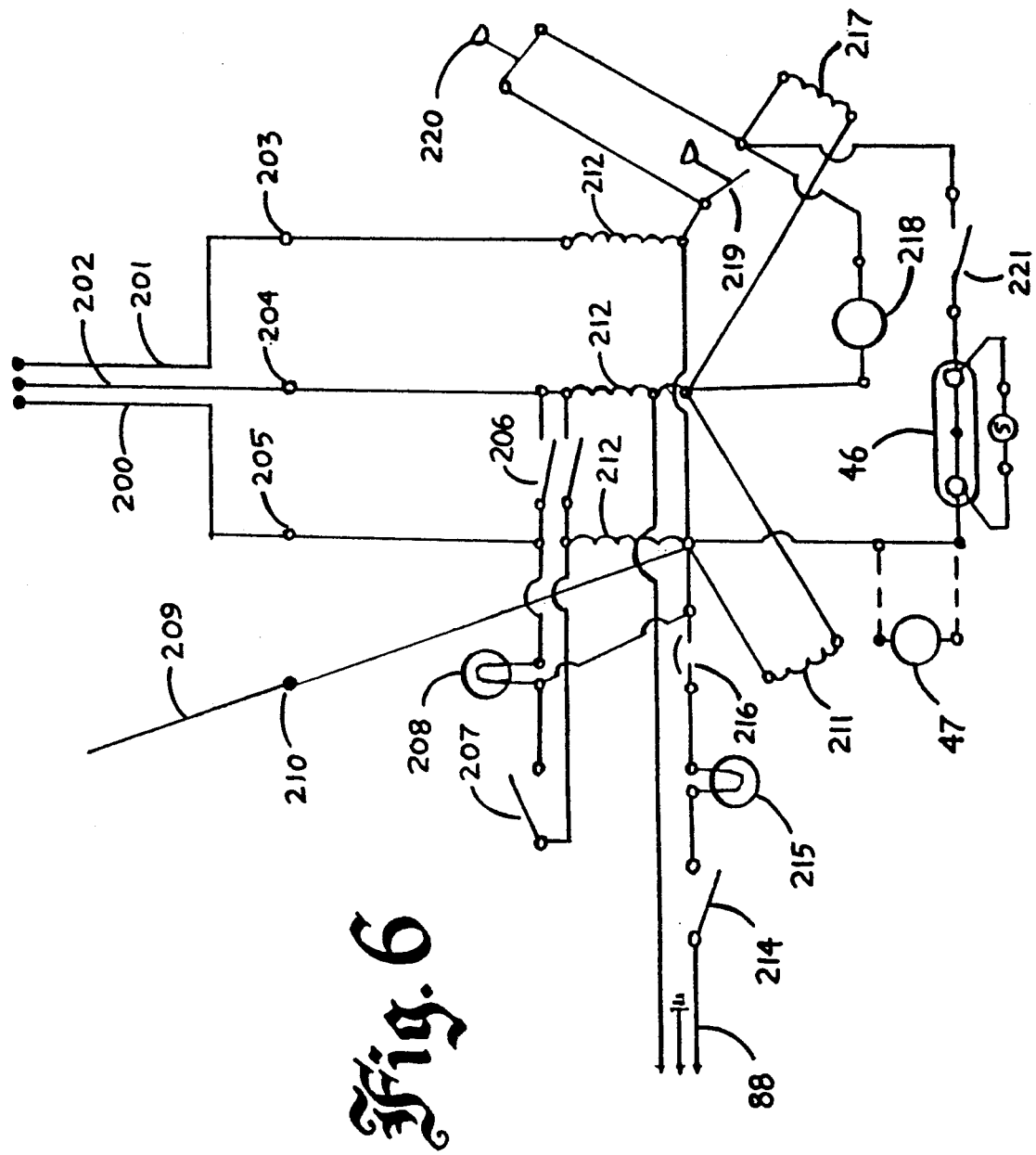
FIG. 6 is the wiring diagram for the electronic control system.

Although above I have described basically the workings of the electronic timing system 40, the building of the electronic circuits to accommodate this timing system is very tricky. The reason for this is that not all washers timing systems work the same and secondly the most common timing system used on washer does not differentiate in signals between the dumping of the wash water and dumping of the rinse water. The wiring diagram of the electronic timing system 40 is shown in FIG. 6 and the inventor believes that this electronic timing system 40 can be attached to virtually all washing machines in use in the United States. There are basically three types of washing machine wiring diagrams presently in use. The first being the common washing timer circuit which is shown in figure five. This circuit does not differentiate between the pumping of the wash water or the pumping out of the rinse water. In another type of washer timer there is a separate pause on a separate circuit that announces the pumping out of rinse water. In the third type of washer timer the rinse water is pumped out by reversing the pump and the electronic timing system can take it's signal from when the washer timer signaling the pump to reverse.

As I stated above, figure five shows the wiring diagram for the most common washer timer in the United States. In this washer timer, there is no differentiation between the signal given to pump out the washers water and the signal given to pump out the rinse water. To make things even more confusing many washer using this timer system have a permanent press cycle with means that there are actually two different washer cycles before the rinse cycle occurs. Figure five shows the electronic timing circuit for the most common type of washer timer. The electronic timing system 40 of the rinse water recycle attaches to this common washer timer 42 by three wires. The first 200 attaches to the wire T. The second wire 201 attaches to the yellow wire with red tracer Y-R which energizes the cold water valve when cold water is needed by the washer. The last wire 202 attaches to the white ground water wire W there by grounding electronically the washer and the rinse water recycling apparatus. Wire 200 connects to the electronic timing system 40 at point 205, wire 201 connects to the electronic timing system 40 at point 203 and wire 202 connects to the electronic timing system 40 at point 204.

In operation for the pumping water from the washer's rinse cycle into the recycle rinse reservoir the electronic timing system 40 receives signal via wire 200 at connection point 205. This signal flows to a two stage delay timer 206. When the electronic timing system receives this first signal the two stage timer does nothing, since this signal is a signal from the washer timer 42 that the washer is pumping out wash water. When the two stage timer 206 receives the second impulse of power which is the signal from the washer/timer 42 that the washer is pumping out rinse water the two stage delay timer 206 directs this second impulse to the diverter valve 24 through relay 212 which is electronically powered by 3 prong plug with ground 88 that is connected to the home 110 volt AC power outlet. Relay 212 signals the solenoid 211 for diverter valve 24.

If the washing machine has a permanent press cycle and the permanent press cycle is in use then the circuit board must wait for the third impulse in order to energize the diverter valve 24. To make the circuit board adaptable to a permanent press cycle switch 207 has been added which is a manual switch which is turned on by the individual doing the washing when they plan to use the permanent press cycle. The circuit board shows that a permanent press cycle is in use by lighting up bulb 208. When switch 207 is switched on it causes the delay timer 206 to wait until third impulse to direct this impulse to solenoid 211 for diverter valve 24 through relay 212.

As I put forth above, there are other types of machines that do in fact differentiate between the wash water being pumped out and the rinse water being pumped out. In one type of these machines the pump is reversed to pump out the rinse water. These machines have a separate wire running to the pump that reverses the pump. The third type of common wash machine has a separate wire for singling the rinse pump. In both these second and third type the wire running to the pump that signal either the pump should be reversed or the pump should pump out the rinse water is connected to the circuit board at 210. In this application the two stage timer 206 and the relay 212 are not necessary for the power is provided directly to the component from the washer's power source via the electronic circuit board of the rinse water recycling apparatus. When the power is sent to the pump it is sent through terminal 210 and directly to diverter valve 24 and solenoid 211.

When the washer's timer calls for cold water from the cold water valve this cold water valve is electronically connected to the circuit board through wire 201 and contact point 203. Power from point 203 goes to switch 219 which is closed when sensor 14 indicates there is water in the reservoir. If switch 219 is closed then the electric flows to pump 218 which begins to pump water from the reservoir into the reservoir inlet valve 34. If sensor switch 219 is closed the solenoid 217 for inlet valve 34 receives power and closes the normally opened cold water supply 36 of the hose and has opened the valve so the water from the reservoir can be pumped into the washer. A second normally closed water overflow switch 220 is located at the top of the apparatus reservoir which delays the closing again until the washer timer control is off and ready for the next wash cycle.

As an option for added sanitary water condition, there can be a germicidal means electronically connected to the water sensor switch 219 electrical circuit and a 24 hour timer 221 which activates the germicidal lamp 46 with starter 222 an effective amount of time to kill micro-organisms in the rinse water should the rinse water remain in the apparatus reservoir for a few days before the consumers next wash. In another embodiment of this system an alternate germicidal means, a germicidal fluid dispenser 47 can be used in leu of the germicidal lamp 46 where in a few drops the germicidal fluid is allocated in each 24 hour period as controlled by the 24 hour timer 221. These systems are both connected to the 110 voltage AC power source 88 to operate this optional equipment.

Figure 5:
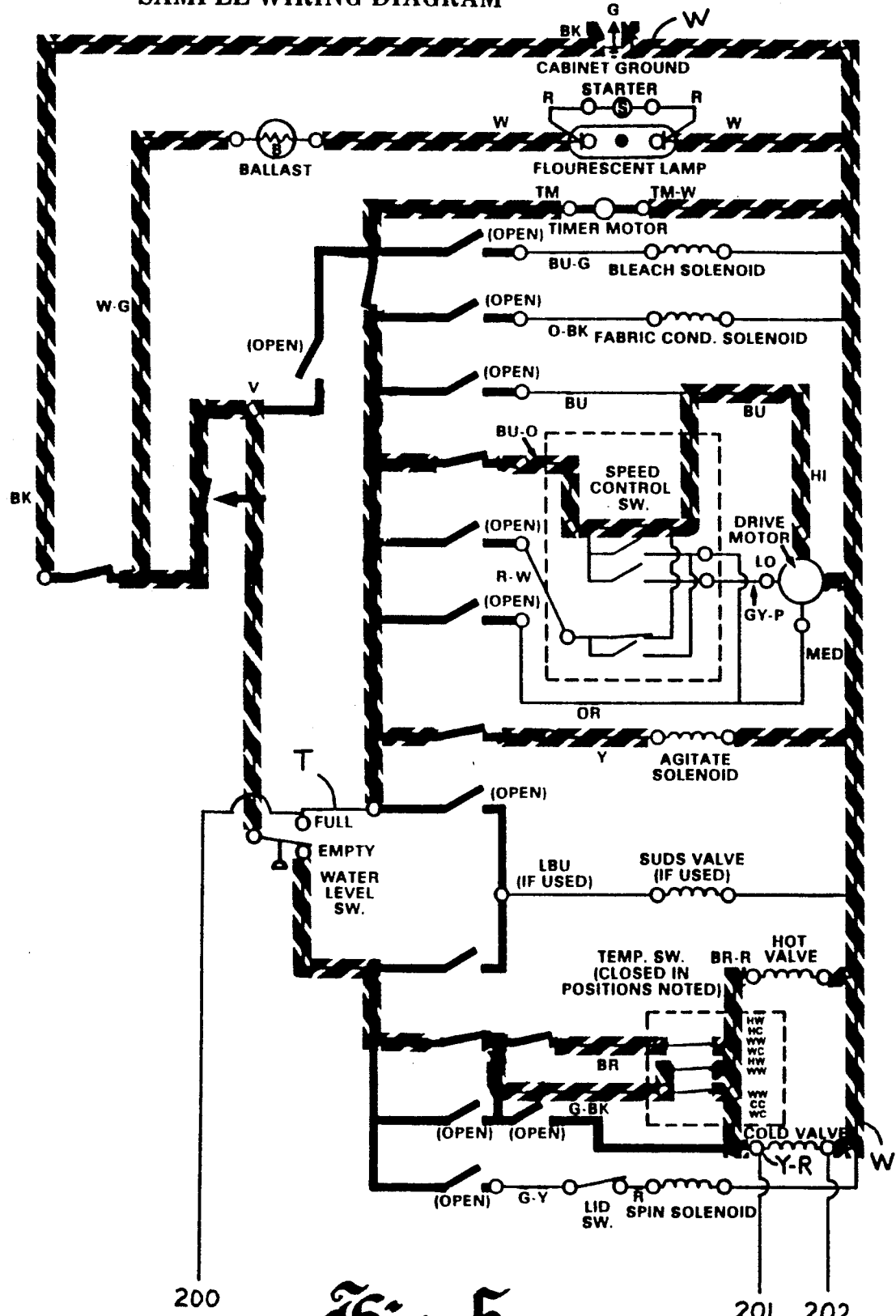
FIG. 5 is a wiring diagram and corresponding timer sequence chart for the most common timer used on washers already in use by consumers

The typical clothes washing machine operation cycle is as follows: fill, wash, spin and drain, spin rinse, spin and drain, fill, deep rinse, pause, and finally spin and drain. The operation of the appliance is controlled by a timer 42 shown in FIG. 5. The water use varies according to the load setting such as small, medium, and large. Permanent press factor use about one third more water due to the additional "fill" cycle in the operation of the machine. The water used can be as low as twenty five gallons to as much as fifty gallons with an average of thirty five. Approximately half is rinse water. When the washing machine enters the last spin and drain cycle, the relative clean rinse water exits the washer and flows to the reservoir 20 as described above. This water is further cleaned by the usual filter 18 within the washer and the filter within the reservoir's cabinet. Also the reservoir contains a germicide means which kills any germs bacteria that could be present in the water and keeps said germs or bacteria's from breeding when the water is in storage's. When the water is pumped back into the washer at the beginning of the wash cycle it is pumped as described above through the cold water supply. This use of the cold water supply is one of the advantages of this invention in that the cold water supply inlet on the washer 10 as shown in FIG. 1 mixes with the hot water supply and thus the individual can use warm or hot water in his first wash cycle regardless of how much or at what temperature the water is stored in the reservoir. Further, it should be pointed out that the operation of the invention utilizes the pump of the washing machine to move the water from the washing machine into the reservoir and the timer for the wash machine for it cycle operation thus reducing the manufacturing cost by eliminating the need for duplicate components within each machine.

Figure 7:
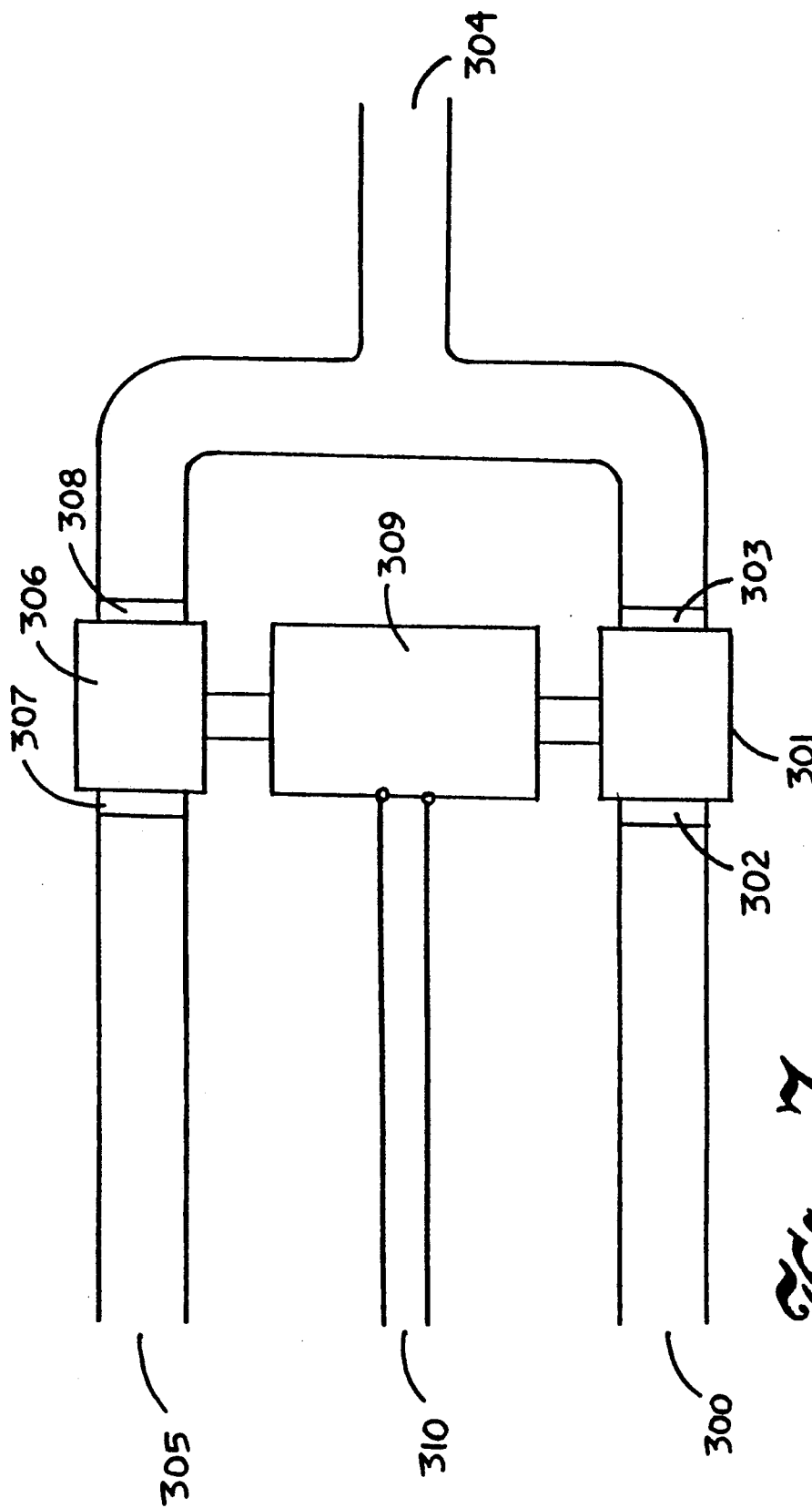
FIG. 7 is a block diagram of the washer input valve.

FIG. 7 shows the washer input valve 34. In this figure the cold water supply 36 that is normally connected to the cold water valve inlet 37 on the washing machine is connected to the washer input valve 34 at the one way water valve 301 that is normally open going into the inlet port 302 thereby facilitating the flow of fresh cold water through outlet port 303 and through the common outlet line 304 to the cold water valve inlet 37 of the washer. When water is pumped from the reservoir 20 of the recycling apparatus this water flows in through line 305 into one way water valve 306 that is normally closed through the inlet port 307 and out the outlet port 308. Solenoid 309 controls the working of valve 301 and 306. When solenoid 309 is energized by electrical connection to the apparatus control assembly through line 310 the one way water valve 301 which normally open is closed and the one way water valve 306 that is normally closed is open at the same time or a little after valve 301. The one way water valve 301 must be able to stand up to 150 pounds per square inch which is the maximum pressure supply by a home water pump from a well. City water lines are typically carry 70-90 pounds per square inch. When one way water valve 306 is open the rinse water from the reservoir must not be able to back flow from the common outlet line 304 through outlet port 303 of the one way water valve 301. Also when the water is coming from the cold water supply 300 it must not be able to have any back flow through the common outlet valve 304. If the water back flows it would result in bacterial contamination of the cold water supply.

In the normal home washer the invention cabinet would have the same height and depth as the standard washing machine and be only about ten inches wide to accommodate twenty five gallons of water. One of the advantages of this compact designee is that it efficiently uses space since it is similar in size to the normal washer. The invention however, can be made much larger in size for larger commercial washer or smaller in size for smaller apartment washers. The shape and size of the reservoir can be modified to fit the needs in the area of the end user.

Figure 3:
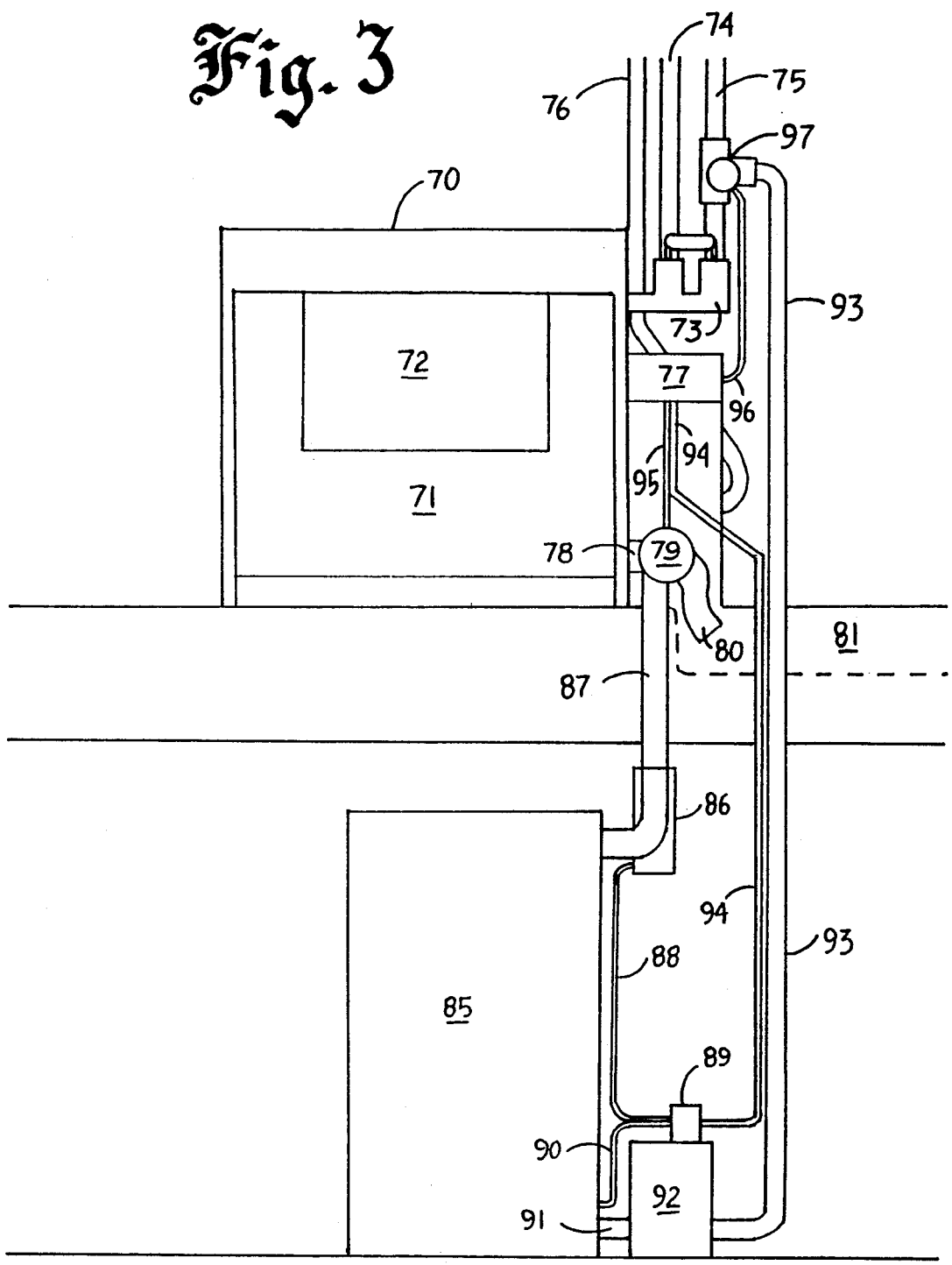
FIG. 3 is a block drawing of a commercial washing machine with invention attached on a lower floor from the commercial washing machine.

FIG. 3 shows an embodiment of the invention for a larger commercial or industrial washer. In FIG. 3, 70 is the washer's extractor and 71 is the washer's tub. Water from the tub 71 flows out of the tub through washer outlet 78. In the normal commercial washer the water flowing to washer's outlet 78 flows into the washer's drain line 80 and into a drain trench 81 to the sewer. However, in this embodiment of the invention a diverter valve 79 is place on the water outlet 78 and allows the water either to flow through the drain line 80 or into a reservoir tank 85. In this preferred embodiment the reservoir tank 85 is on a floor below the washer 71. However, the tank 85 could be right next to the washer or in an adjoining room to the washer. The place of the tank is not critical for the working of the invention. In this embodiment the water diverted by diverter valve 79 flows through the connecting pipe 87 into a lint filter 86 and than into the reservoir 85. In the system when the water coming from the tub 71 is the final rinse water the water flows through water outlet 78 into the diverter valve 79 which diverts the water into the connecting pipe 87. Then the water flows through filter 86 and into the reservoir 85. All other water coming from the tub 71 flows into valve 79 and into the wash's drain line 80 and then to the drain trench and the sewer.

When the washer is started up and there is water in the reservoir 85 that water is pumped from the reservoir by pump 92 which is connected to the reservoir 85 by the reservoir outlet 91. The water is pumped by pump 90 through rinse water return line 93 into two way valve 97 and into the washer water mixing valve assembly 73. In the water mixing assembly valve 73 the rinse water from the reservoir is mixed with hot water from the hot water source 74 and allowed to flow into tank 71 of the washer when the washer begins its wash cycle. Thus, the rinse water from the final rinse of the washer 70 which was stored in the reservoir 85 is now used to begin the wash of a new load of clothes in the washer 70.

Valve 97 is a two way valve that has two inlets and one outlet. Water can move through valve 97 either from the cold water source or the reservoir 85. At the beginning of the wash cycle when there is water in the reservoir 85 the valve 97 allows the water from the reservoir 85 to flow into the water mixing valve assembly. On all other cycles or when there is no water in the reservoir 85 the valve 97 allows the water from the cold water source 74 to flow into the water mixing valve assembly. pressure.

The whole process as in the above embodiment is controlled by an electronic timing system 77. Electronic control system 77 controls the diverter valve 79 the pump 92 and a two way water inlet valve 97. The electronic timing system 77 also receives signals from a water sensing assembly 90, that is placed in the bottom of the reservoir 85 and senses the presence of water in the reservoir 85. In addition, there is a normally closed over flow prevention water sensor (not shown) with a time release at the top of the reservoir 85 that opens when rinse water reaches the top of the reservoir 85 which de-energizes the solenoid of the water inlet two-way valve 97 thereby returning it to the normally open position allowing water to flow into the washer 70 from the cold source line 75. The over flow prevention water sensor returns to the normally closed position after the timer assembly 77 directs the washer 70 to the next wash cycle thereby enabling normal operation of the rinse water recycling apparatus. When the washer's timer signals the electronic timing system 77 that the wash cycle is beginning, the electronic timing system 77 checks with the sensor 90 to see whether there any water in the reservoir 85. If in fact there is water in the reservoir 85 the electronic timing system 77 signal the pump 92 to begin pumping water out of the reservoir 85 and into the two way valve 97. The electronic timing system 77 also signals the two way valve 97 to close off the cold water supply 75 and too open the reservoir portion of the valve and allow the water to flow from the reservoir 85 into the washer 70. When the washer's timer signal the electronic timing system 77 that the water is needed for other cycles of the washer 70 the electronic timing system 77 signal the two way valve to open the cold water supply so that the water from the cold water supply can flow into the washer for these cycles. When the washer's timer signals the electronic timing system 77 that the final rinse is beginning to empty from the washer 70 the electronic timing circuit 77 closes the flow channel of the diverter value 79 to the drain and opens the channel of the diverter valve 79 to the reservoir 85 allowing the water from the final rinse water to flow from the washer 70 into the reservoir 85. When the washer's timer signal the electronic timing circuit 77 the water is being drained from the tub from cycles other than the final rinse cycle the electronic timing system 77 signal the valve 79 to close its flow to the reservoir and to open the flow channel to the drain line 80.

Figure 4:
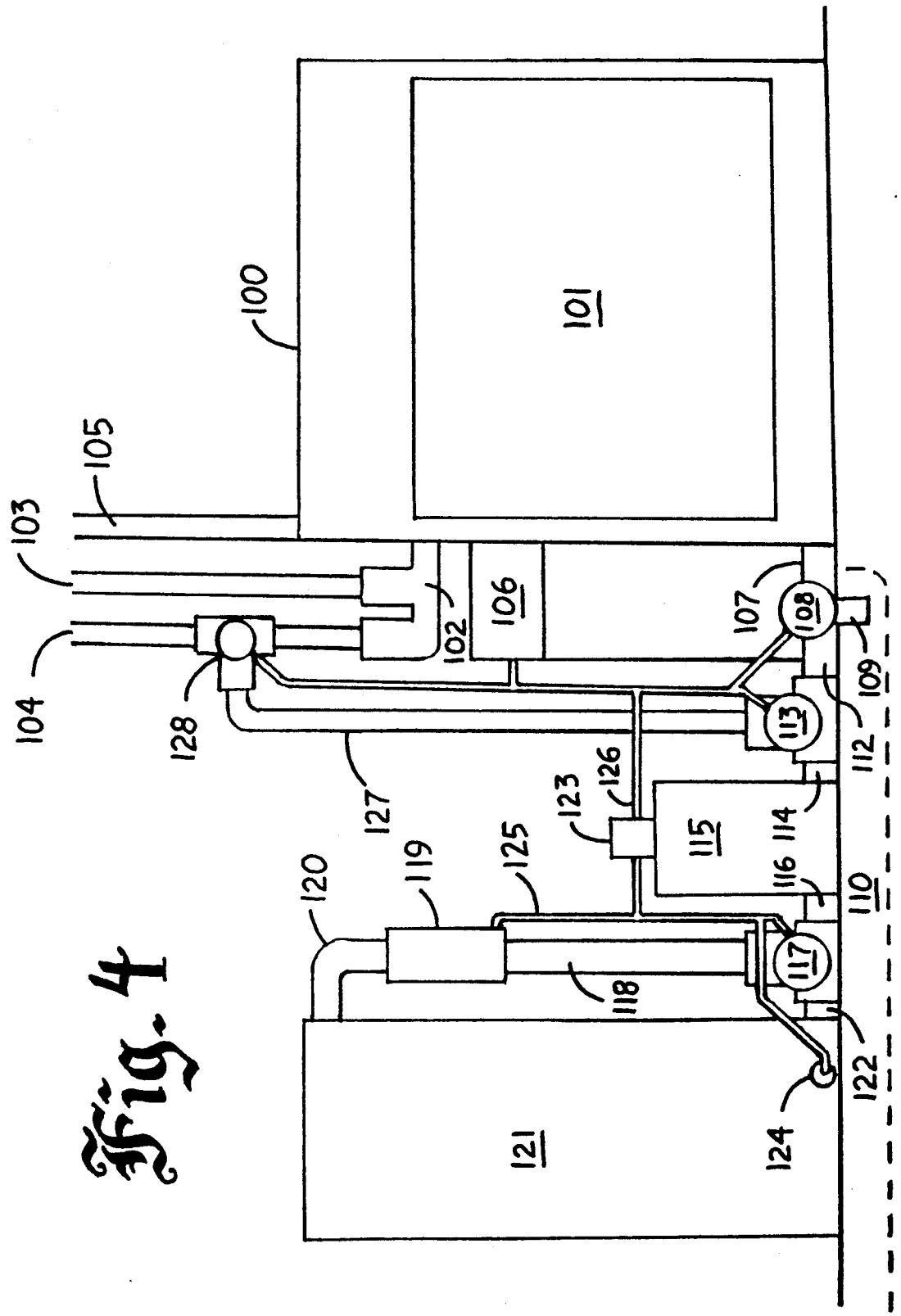
FIG. 4 is a block diagram of a commercial washer with invention attached said invention sits next to the washer on the floor.

Another embodiment of the commercial clothes washing machine rinse water recycling apparatus is shown in FIG. 4. In this figure it shows a rinse water cycling apparatus for an institution with the reservoir sitting next to the washer on the floor. The operation of this embodiment is the same as FIG. 3 except for pump 115 and two additional two way valves 113 and 117 are added. In this embodiment water from the washer tub 71 passes out through water outlet 107. Under normal conditions the water flows out outlet 107 into diverter valve 108 and into trench 110 to the sewer. However, when the water is a final rinse water the cycle the water flows from valve 108 into line 212 and further into two way valve 113. The water flows through valve 113 into the line 114 which runs to pump 115. Pump 115 is a two way pump. In this case water is pumped into line 116 and on into two way valve 117. This valve sends the water to the filter 119 through line 118. The water flows from the line 119 into the reservoir 121 through line 120.

When the rinse water is returned to the wash cycle it begins in reservoir 121 and flows out through line from the reservoir 122 through the two way valve 117 and further through line 116 into pump 115 where it is pumped into two way valve 113 through line 114. The two way valve 113 diverts the water into line 127 where it flows into the washer inlet valve 128. The washer inlet valve is a valve that has two ins and one out. When the washer is taking water from the reservoir, the water flows through one of the inlets in 128 and into the cold water source of the washer. In other cycles beside the beginning of the wash cycle, inlet valve 128 closes off the inlet from line 127 and allows the water from the cold water source to flow into the washer.

The whole process is in the above embodiment is controlled by electronic timing system 123. The electronic control system 123 controls the diverter valve 108, valves 113, 117 and valve 128 as well as sensor 124 which sensors water in the reservoir 121. When the washer's timer signals the electronic control system 123 that the final rinse water is being dumped from the tub 101 electronic control system 123 signal diverter valve 108 and tells it to close line 109 and open line 112 allowing the rinse water to flow into valve 113. Electronic timing cycle also tells valve 113 that it is to close the outlet 127 and allow the water to dump into line 114. The electronic timing system also notifies pump 115 to pump the water in the direction towards the reservoir through line 116. The electronic timing system 123 further notifies valve 117 to divert the water from line 116 into line 118 so that it will flow into the reservoir.

When the washer notifies the electronic system 123 that the wash cycle is beginning the electronic timing system 123 checks to see if there is any water in the reservoir by sensor 124. If there is water in the reservoir 124 electronic system sends a signal to valve 117 to allow the water from line 122 to flow into line 116 and further into pump 115. The electronic timing system further turns on pump 115 to pump in the direction of line 114. The electronic timing system further notifies valve 113 to close line 112 and open line 127 so that the water from the pump can flow into the washer input valve. Further the timing system then notifies valve 128 to close off line 104 and open line 128 so the water from the reservoir can now flow into the water mixing area of the washer 102 and further into the washer's tub.

Changes and modification in the specifically described embodiment can be carried out without departing from the scope of the invention which is intended to be limited only by the scope of the appending claims.

What is claimed is:

1. An apparatus for recycling the rinse water for use with a washing machine that has a wash cycle and a rinse cycle and a timing system comprising;
 a. a reservoir; and,
 b. a means for directing water from the rinse cycle to the reservoir and directing water from the wash cycle to a drain, comprising;
   (1). a first valve with one inlet and two outlets, and said valve inlet is attached to a line that drains the washing machine's wash and rinse cycle and one of the outlets of said valve directs water from the washing machine into the reservoir and the other outlet of said valve directs water into the drain; and,
   (2). a first timing system hooked to the washing machine's timing system that when signaled by the washing machine's timing system that there is drainage of the rinse cycle, said first timing system will signal said first valve to close the outlet directing water to the drain and open the outlet directing water to the reservoir so the water from the washing machine can flow into the reservoir and when the washing machine's timing system signals the first timing system that water other than from the rinse cycle is being drained, said first timing means will signal the first valve to close the outlet directing water to the reservoir and open the outlet directing water to the drain; and,
c. a means for directing water from the reservoir into the washing machine.

2. An apparatus for recycling the rinse water for use with a washing machine that has a wash cycle and a rinse cycle and a timing system comprising:
a. a reservoir; and,
b. a means for directing the water from the reservoir into the washing machine comprising;
  (1). a pump attached to the reservoir; and,
  (2). a valve that has two inlets and one outlet, and one inlet is attached to the pump and the other inlet is attached to a cold water supply and said outlet is attached to the washing machine where the cold water supply normally is attached; and,
  (3). a second timing system which when signaled by the washing machine's timing system that a wash cycle is beginning, turns on said pump which pumps water from the reservoir into the valve and said second timing system also signals said valve so that said valve opens the inlet from the reservoir and closes the inlet for the cold water supply and when the washing machine's timing system signals the second timing system that it needs water other than at the beginning of the wash cycle said second timing system causes the inlet valve to the reservoir to close and the inlet valve on the cold water supply to open; and,
c. a means for directing water from the rinse cycle to the reservoir and directing water from the wash cycle to a drain.

3. An apparatus as in claim 1 wherein:
a. the means for directing water from the reservoir into the washing machine comprising;
  (1). a pump attached to the reservoir; and,
  (2). a second valve that has two inlets and one outlet, and one inlet is attached to the pump and the other inlet is attached to a cold water supply and said outlet is attached to the wash machine where the cold water supply normally is attached; and,
  (3). a second timing system which when signaled by the washing machine's timing system that a wash cycle is beginning, turns on said pump which pumps water from the reservoir into the second valve and said second timing system also signals said second valve so that said second valve opens the inlet from the reservoir and closes the inlet from the cold water supply and when the washing machine's timing system signals the second timing that it needs water other than at the beginning of wash cycle, said second timing system causes the inlet to the reservoir of the second valve to close and the inlet to the cold water supply of the second valve to open.

4. An apparatus as in claim 3 further comprising:
a. a filter that is attached between the reservoir and the outlet of said second valve.

5. An apparatus as in claim 4 further comprising:
a. a means for killing germs and bacterial within the reservoir.

6. An apparatus as in claim 5 wherein:
a. the means for killing germs and bacterial is a germicidal lamp.

7. An apparatus as in claim 5 wherein:
a. the means for killing germs and bacterial is a means for dispensing a germicidal fluid.

8. An apparatus as in claim 3 wherein:
a. the first timing system comprising:
  (1) a means for detecting when the washing machine is draining water from the rinse cycle when the washing machine's timing system does not differentiate between when the wash cycle drains or when the rinse cycle drains;
  (2) a means for detecting when the washing machine is draining water from the rinse cycle when the washing machine's timing system has a specific signal that designates the drainage of water from the rinse cycle; and,
  (3) a means for notifying the first valve to close the outlet of said first valve that directs water into the drain and to open the outlet of said first valve that directs water into the reservoir when the electronic timing system detects that the washing machine is draining rinse water.

9. An apparatus as in claim 3 wherein:
a. the first and second timing means are electronic.

10. An apparatus as in claim 3 further comprising:
a. a means for sensing the presence of water in the reservoir; and,
b. said means is attached to the second timing means and said second timing means after it has received a signal from the washing machine's timing system that a wash cycle is beginning checks the sensing means in the reservoir to see if the reservoir contains water.

11. An apparatus as in claim 3 wherein:
a. the second valve comprising:
  (1) a first inlet; and
  (2) a first control means that is attached to the first inlet so that a liquid can flow through the first inlet and to said first control means; and
  (3) a second inlet; and
  (4) a second control means that is attached to the second inlet such that a liquid can flow through the second inlet and to the second control means; and
  (5) an outlet that is attached to the first and second control means such that liquids flowing into the first inlet and through the first control means will flow into the outlet and that liquids that flowing into the second inlet and through the second means will flow into the outlet; and
  (6) a solenoid attached to the first and second control means, and said solenoid controls the flow of liquids through said first and second control means, and said first control means remains in an open state until said solenoid closes said first control means, and said second control means remains in a closed state until said solenoid opens said second control means, and that when the second control means is in a closed state no liquids pass from the second inlet to the outlet, and when the first control means is in a closed state no liquid passes from the outlet into the first inlet, and when the solenoid closes the first control means and opens the second control means, no liquid will flow from the second inlet into the first inlet.

12. An apparatus as in claim 1 wherein:
a. the first timing system comprising:
   (1) a means for detecting when the washing machine is draining water from the rinse cycle when the washing machine's timing system does not differentiate between when the wash cycle drains or when the rinse cycle drains.
   (2) a means for detecting when the washing machine is draining water from the rinse cycle when the washing machine's timing system has a specific signal that designates the drainage of water from the rinse cycle; and,
   (3) a means for notifying the first valve to close the outlet of said valve that directs water into the drain and to open the outlet of said valve that directs water into the reservoir when the electronic timing system detects that the washing machine is draining rinse water.

13. An apparatus as in claim 2 wherein:
a. the valve comprising:
   (1) a first inlet; and
   (2) a first control means that is attached to the first inlet so that a liquid can flow through the first inlet and to said first control means; and
   (3) a second inlet; and
   (4) a second control means that is attached to the second inlet such that a liquid can flow through the second inlet and to the second control means; and
   (5) an outlet that is attached to the first and second control means such that liquids flowing into the first inlet and through the first control means will flow into the outlet and that liquids that flowing into the second inlet and through the second control means will flow into the outlet; and
   (6) a solenoid attached to the first and second control means, and said solenoid controls the flow of liquids through said first and second control means, and said first control means remains in an open state until said solenoid closes said first control means, and said second control means remains in a closed state until said solenoid opens said second control means, and that when the second control means is in a closed state no liquids pass from the second inlet to the outlet, and when the first control means is in a closed state no liquid passes from the outlet into the first inlet, and when the solenoid closes the first control means and opens the second control means, no liquid will flow from the second inlet into the first inlet.

14. An electronic timing system for an apparatus for recycling final rinse water of a washing machine with a wash cycle and a rinse cycle, said apparatus has a reservoir, a first water diversion means for directing water from the wash cycle to a drain and water from the rinse cycle to the reservoir, and a second water diversion means for directing the water in the reservoir into the washing machine for the wash cycle of said washing machine comprising:
   (a). a means for detecting when the washing machine is draining water from the rinse cycle when the washing machine's timing system does not differentiate between when the wash cycle drains or when the rinse cycle drains;
   b. a means for detecting the signal from the washing machine's timing system that the washing machine is draining the rinse cycle when the washing machine's timing system has a specific signal that designates that the washing machine is draining the rinse cycle; and
   c. a means for detecting whether the reservoir has water within it; and
   d. a means for detecting the washing machine signal when the washing machine begins a wash cycle; and
   e. a means for notifying the first water diversion means when the electronic timing system detects that the washing machine is draining the rinse cycle; and
   f. a means for notifying the second water diversion means when the electronic timing system detects that the reservoir has water and that the washing machine is beginning a wash cycle.

15. An apparatus comprising:
   a. a first inlet; and
   b. a first control means that is attached to the first inlet so that a liquid can flow through the first inlet and to said first control means; and
   c. a second inlet; and
   d. a second control means that is attached to the second inlet such that a liquid can flow through the second inlet and to the second control means; and
   e. an outlet that is attached to the first and second control means such that liquids flowing into the first inlet and through the first control means will flow into the outlet and that liquids flowing into the second inlet and through the second control means will flow into the outlet; and
   f. a solenoid attached to the first and second control means, and said solenoid controls the flow of liquids through said first and second control means and said first control means remains in an open state until said solenoid closes said first control means, and said second control means remains in a closed state until said solenoid opens said second control means, and that when the second control means is in a closed state, no liquid passes from the second inlet to the outlet and when the first control means is in a closed state, no liquid passes from the outlet into the first inlet, and when the solenoid closes the first control means and opens the second control means, no liquid will flow from the second inlet into the first inlet.

16. An apparatus for recycling water for use with a washing machine that has a wash and a rinse cycle comprising:
   a. a reservoir; and,
   b. a first water diversion means for directing water from the wash cycle to the drain and water from the rinse cycle to said reservoir; and,
   c. a second water diversion means for directing rinse water in the reservoir to said washing machine for the wash cycle on a subsequent load of laundry; and,
   d. a means for controlling said wash and rinse cycle and said first and second water diversion means and said control means determines whether the wash cycle or rinse cycle is draining water and if the wash cycle is draining water it informs the first water diversion means to direct water to the drain and if the rinse cycle is draining it informs the first water diversion means to direct water to the reservoir and said control means upon a wash cycle beginning determines if there is water in the reservoir and if there is water in the reservoir informs the second water diversion means to direct water from the reservoir into the wash cycle.

17. An apparatus as in claim 16 wherein:
 a. the reservoir is placed in close proximity to the washing machine.

18. An apparatus for recycling rinse water as in claim 16 wherein:
 a. the first water diversion means comprises a valve that has one inlet and two outlets and said valve inlet is attached to a line that drains the washing machine's wash and rinse cycle and one of the outlets of said valve directs water from the washing machine into the reservoir and the other outlet of said valve directs water from the washing machine into the drain.

19. An apparatus for recycling rinse water as in claim 16 wherein:
 a. the second water diversion means comprises
   (1) a pump attached to the reservoir; and,
   (2) a valve that has two inlets and one outlet, and one inlet is attached to the pump and the other inlet is attached to a cold water supply and said outlet is attached to the washing machine where the cold water supply normally is attached.

20. An apparatus for recycling rinse water as in claim 19 wherein:
 a. the first water diversion means is a second valve that has one inlet and two outlets and said second valve inlet is attached to the line that drains the washing machine's wash and rinse cycle and one of the outlets of said valve directs water from the washing machine into the reservoir and the other outlet of said valve directs water from the washing machine into the drain.

* * * * *